Inventor
W. P. Sullivan.

UNITED STATES PATENT OFFICE.

WALTER P. SULLIVAN, OF HORTON, KANSAS.

AUTOMATIC GEAR-SHIFTING MECHANISM.

1,226,144.            Specification of Letters Patent.            Patented May 15, 1917.

Application filed August 9, 1916. Serial No. 113,979.

*To all whom it may concern:*

Be it known that I, WALTER P. SULLIVAN, a citizen of the United States, residing at Horton, in the county of Brown and State of Kansas, have invented certain new and useful Improvements in Automatic Gear-Shifting Mechanisms, of which the following is a specification.

My invention relates to new and useful improvements in gear shifting mechanisms, the primary object of my invention being the provision of an improved gear shifting mechanism for shifting the gears of the transmission gearing upon motor vehicles.
A further object of my invention consists in the provision of a gear shifting mechanism which is operated by means of a relatively small selector lever which may be mounted at any convenient point, such as upon the steering column of the vehicle, and which will not require either strength or skill in its operation.

In this connection, a further object of my invention consists in the provision of means which must be thrown into operation before the selector lever can be manipulated to change the transmission gearing, which will cause a disengagement of the clutch between the crank shaft of the engine, and the drive shaft leading to the transmission gearing.

More specifically, my invention includes means whereby the power of the engine itself may be utilized for releasing the clutch prior to shifting the gears, and to further provide means whereby the clutch will be automatically released when the gears have been shifted, this latter means being such as to bring the co-acting clutch members into gradual active engagement with each other to prevent sudden shocks and strains upon the transmission gearing and engine.

A still further object of my invention consists in the provision of a lock for normally holding the clutch releasing mechanism in inactive position, in a release for the lock, and in a mechanism for returning the lock to active position after the gears have been shifted and the clutch has been again thrown in.
Another object which I have in view consists in the provision of a simple and compact selector mechanism for actually shifting the gears of the transmission, from any speed in which it may be set, to any desired speed.

With these and other objects in view, my invention will be more fully described, illustrated in the accompanying drawings, and then specifically pointed out in the claims which are attached to and form a part of this application.

Corresponding and like parts are referred to in the following description and indicated in all the views of the drawings by the same reference characters.

To insure a clear and accurate understanding of my invention, its application and operation, I have illustrated it in connection with a conventional form of clutch and selective sliding gear transmission. It will, however, be understood that it can be used with any sliding selective type of gear transmission and either built into the casing or housing of the transmission gearing or placed on top of the housing at any convenient point. It will further be understood that the type of clutch employed is immaterial.

Figure 1:
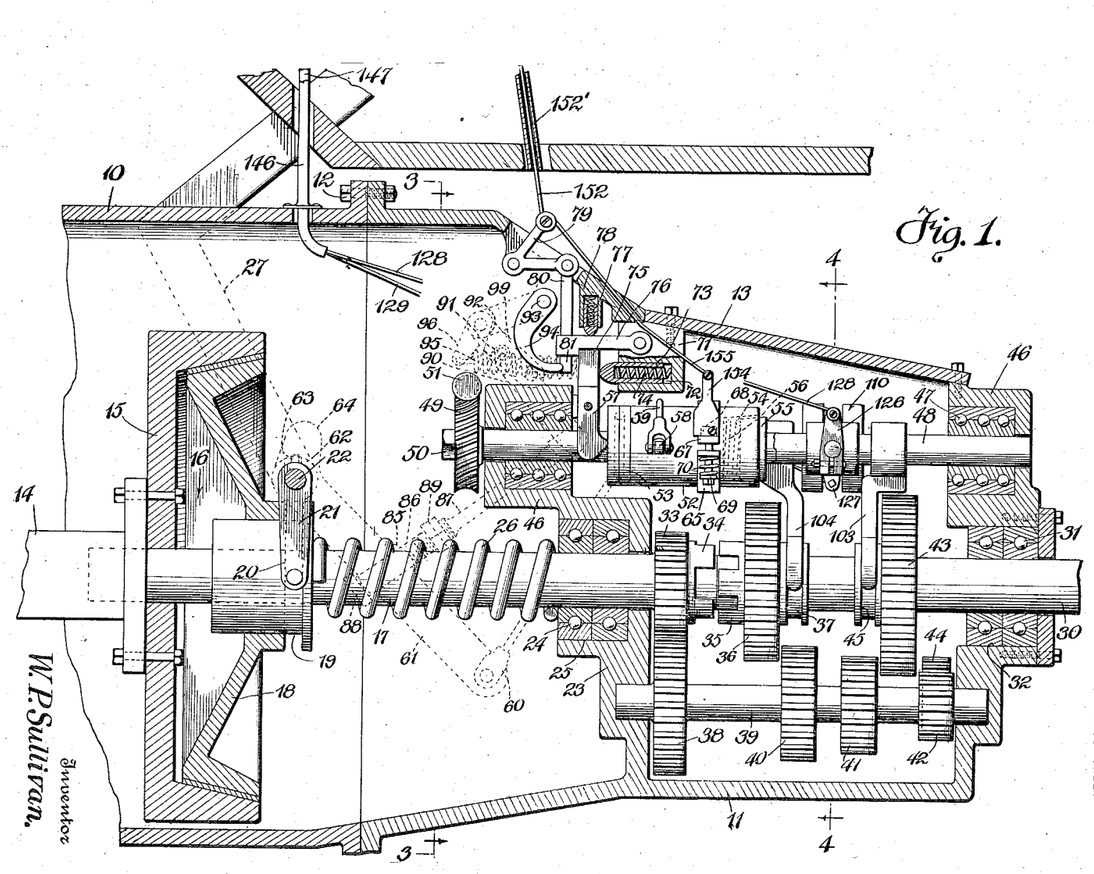
Figure 1 is a vertical longitudinal central sectional view showing my invention applied to a conventional form of transmission gearing of the sliding selective type.
Figure 2:
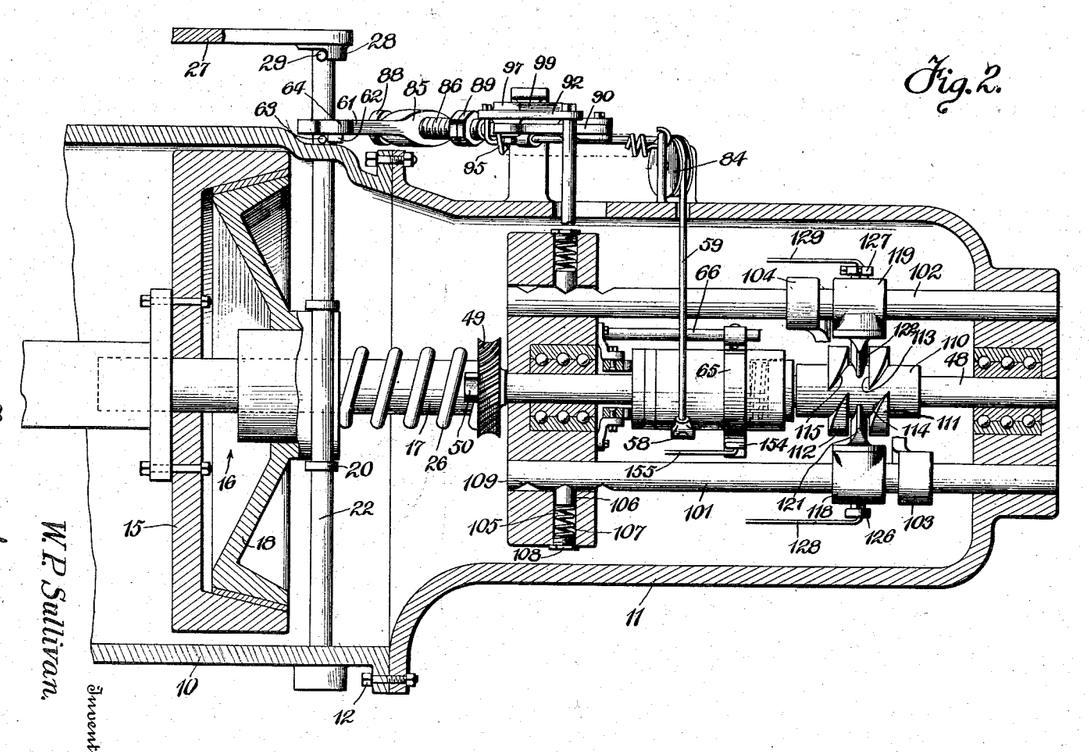
Fig. 2 is a longitudinal sectional view taken at right angles to the section shown in Fig. 1.
Figure 3:
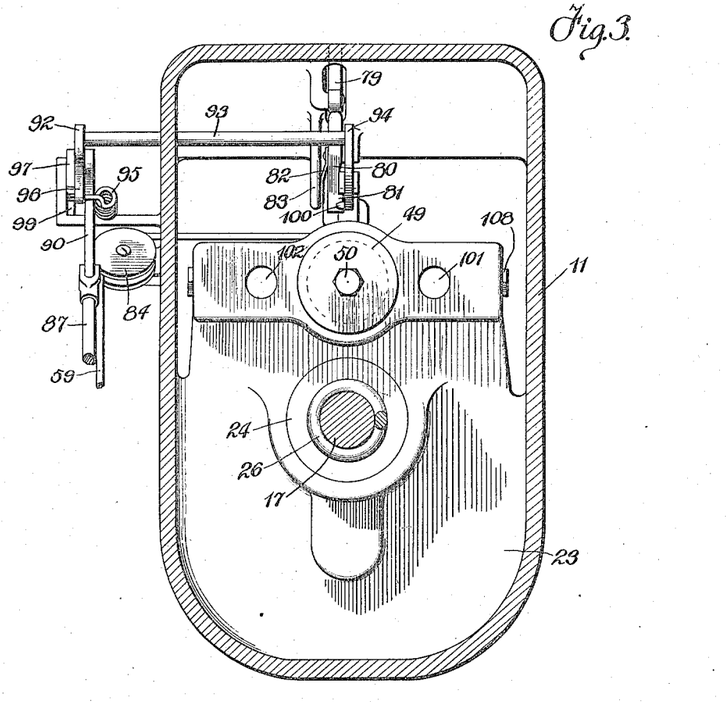
Fig. 3 is a transverse sectional view taken on the line 3—3 of Fig. 1, looking in the direction of the arrows.
Figure 4:
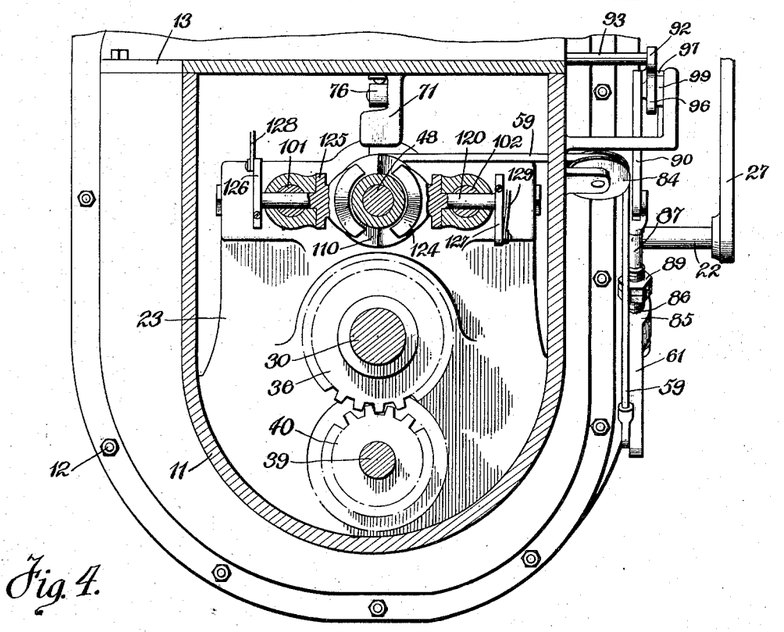
Fig. 4 is a corresponding view taken on the line 4—4 of Fig. 1, looking in the direction of the arrows;

Referring particularly to Figs. 1 and 2 of the drawings, I have shown a housing including a forward portion 10 and rear portion 11, the former inclosing the clutch and the latter inclosing the transmission gearing proper, the control mechanism being located within these housings. These housings are secured together by bolts 12 and the latter housing is preferably formed with a removable cover plate 13 to permit ready access to the parts inclosed therein. Obviously, the specific structure or shaping of the housing forms no part of this invention and no further description is deemed necessary. The crank shaft 14 of the engine leads into the forward end of the housing section 10 and is secured to one member 15 of a conventional form of cone clutch 16. The end of the crank shaft 14 is formed with a socket to receive one end of a drive shaft 17 to which is slidably fixed the other member 18 of the cone clutch, this latter member being formed with a grooved collar 19 to receive rollers carried by the forked end 20 of a shipper lever 21 which is mounted upon a transverse shaft 22 and fixed to turn with the shaft.

The housing section 11 is formed intermediate its length and throughout the greater portion of its height with a transverse partition wall 23 through which the drive shaft 17 extends, this drive shaft being journaled in suitable bearings 24 retained in a bearing cup 25 formed in the partition wall. A stiff helical spring 26 surrounds the drive shaft 17 bearing at one end against the bearings 24 and at its other end against the clutch collar 19 to normally hold the clutch members in active engagement with each other. The shank 27 of the usual foot operated clutch pedal, not shown, is loosely mounted at one end upon the shaft 22 and is formed at one side with a laterally directed shoulder 28 adapted to engage a pin or projecting lug carried by the shaft 22 so that a forward swinging of the upper end of the pedal shank 27 will cause turning of the shaft 22 to release the clutch, while at the same time the shaft 22 may be turned by other means to release the clutch without causing swinging of the clutch pedal. The reason for this specific manner of mounting the clutch pedal shank upon the clutch shaft 22 will be readily understood in connection with the clutch releasing mechanism to be later explained.

The shaft 30 is journaled in suitable bearings 31 mounted in a bearing cup or ring 32 formed at the rear of the casing section 11 and extends in axial alinement with the drive shaft 17. A spur gear 33 is fixed upon the drive shaft 17 at the rear of the partition wall 23 and at its rear face its hub is formed with clutch teeth 34 for interlocking engagement with clutch teeth 35 formed upon the hub of a spur gear 36 keyed to but slidable upon the shaft 30, the opposite side of the hub of this spur gear 36 being formed with a grooved collar 37 for engagement by a shipper lever, as will be later explained. The spur gear 33 constantly meshes with a spur gear 38 fixed upon a counter-shaft 39 upon which are also fixed the spur gears 40, 41 and 42. The spur gear 36 upon the shaft 30 may be moved to lock with the spur gear 33 upon the drive shaft 17 for a direct drive to the axle or may be moved in the opposite direction to mesh with the spur gear 40 for an intermediate speed drive. An additional spur gear 43 is keyed to but slidable upon the shaft 30 and is movable to either mesh with the spur gear 41 for a low speed drive or with an idler gear 44 which constantly meshes with the gear 42 for a reverse speed drive. This spur gear 43 is formed with a grooved hub or collar 45 to receive a shipper lever, as will be later explained. The above described parts are illustrated and described only to insure a clear understanding of my invention.

The rear wall of the housing section 11 and the partition wall 23 are provided, preferably vertically above the bearings 24 and 31, with alined bearing cups 46 to receive bearings 47 in which is journaled a shaft 48. This shaft 48, at its forward end, projects through the partition wall 23 and carries a worm wheel 49 which is locked against displacement by a nut 50. A worm shaft 51 has its threads meshing with this wheel and extends through the wall of the housing and in practice is constantly driven from some driven shaft of the engine, such as its cam shaft, magneto shaft or pump shaft.

Loosely mounted upon the shaft 48 is a winding drum 52 carrying a thrust bearing collar 53 and formed at its other end with a frusto-conical recess 54 adapted to receive a frusto-conical clutch member 55 fixed to the shaft 48. A helical spring 56 seats in the socket or recess 54 and normally holds the winding drum against locking engagement with the clutch member 55. A U-shaped shipper lever 57, pivoted intermediate its length, straddles the shaft 48 and may be swung into engagement with the bearing collar 53 to force the winding drum into locking engagement with the clutch member 55, whereby the drum will be driven by the shaft 48. The drum 52 carries an eye 58 to which is connected one end of a cord 59, the opposite end of which is connected to an eye 60 carried by the lower end of a lever 61, the opposite end of which engages loosely about the clutch shaft 22. That end of the lever 61 engaging about the clutch shaft is formed with an offset shoulder 62 adapted, upon upward swinging of the free end of the lever, to engage a pin 63 carried by the shaft 22 and to, consequently, turn the shaft to move the clutch members 15 and 18 out of engagement with each other. This same end of the lever is provided with an upwardly projecting nose 64 engageable with the casing 10 to limit the swinging of the lever 61. Obviously, when the winding drum 52 is disengaged from the clutch member 55, the spring 26 will immediately act to move the clutch member 18 into engagement with the clutch member 15 and in order to prevent too rapid locking of these clutch members, I provide a brake band 65 which I position about the winding drum 52 and secured against turning movement by any suitable means as by connection to the bracket 66. This brake band is in the form of a split resilient ring provided with any suitable lining and having spaced ears 67 through which extends a bolt 68 having a nut 69. A helical spring 70 engages between one of the ears and the nut and the resistance which the brake band will offer against turning of the winding drum may be varied by adjustment of the nut 69 to change the tension of the spring 70.

A bracket 71 is either secured to or formed integrally with the casing and is formed with a cylindrical recess 72 to receive a plunger 73 and a spring 74 which constantly tends to hold the plunger in extended position. The intermediate portion of the shipper lever 57 is formed with an upwardly directed extension 75 against which the free end of the plunger 73 constantly engages, the strength of the spring of this plunger being sufficient to overcome the strength of the spring 56, whereby the shipper lever may force the winding drum into locking engagement with the clutch member 55. As a means for normally holding the shipper lever in such a position that the winding drum will be out of engagement with the clutch member 55, I provide a latch 76 which is swingingly mounted at one end upon the bracket 71 and which has a hooked terminal engaging over the extension 75 of the shipper lever. This latch is normally held in the position shown in Fig. 1 by a spring pressed plunger 77 corresponding to the plunger 73 and similarly mounted in a bracket 78. Pivoted within the housing, is a bell crank lever 79 to one arm of which is connected a latch lifting arm 80 formed at its lower end with a hooked terminal 81 engaging beneath the hooked terminal of the latch 76. This latch releasing member 80 is so pivoted to the bell crank lever as to always hang downwardly and is also so mounted to be free for movement laterally toward and away from the latch 76, being normally held in such position as to automatically engage beneath the latch by a leaf spring 82 which engages a bracket 83 extending from the housing.

From the foregoing description, it will be obvious that if the bell crank lever 79 is swung to draw upwardly upon the latch releasing member 80, the latch 76 will be disengaged from the shipper lever 57 and the plunger 73 will swing the shipper lever to move the winding drum 52 into locking engagement with the clutch member 55. Assuming that the engine is running and, consequently, that the shaft 48 is rotated, the rotating drum 52 will wind the cable 59 to draw upwardly upon the lever 61 and release the clutch 16, thereby disconnecting the transmission gearing from the crank shaft of the engine. As soon as the nose 64 of the lever 61 engages the clutch member 18, further movement of the clutch member and lever will be stopped, this being permitted by slippage between the winding drum 52 and clutch member 55. The cable 59, as best shown in Fig. 2 of the drawings, is preferably passed about a pulley 84 in order that it may be wound evenly about the drum 52. The means by which the bell crank lever 79 is swung will be later explained.

As a means for disengaging the winding drum 52 from the clutch member 54, I provide the intermediate portion of the lever 61 with an eye 85 through which I loosely pass a threaded portion 86 of a link 87 terminating at one end in a head 88 which engages the lower face of the lever 61. Nuts 89 are adjustable upon the threaded portion of the link 87 and engage each other, whereby they are automatically locked in adjusted position and in spaced relation to the upper face of the lever 61 in order to permit a certain amount of movement of this lever sufficient to disengage the clutch 16 fully before causing any movement of the link 87. The opposite end of this link is connected to one end of a lever 90 which is pivoted intermediate its length, as shown at 91, and which, at its free end, pivotally carries a bell crank lever 92 through one arm of which extends a shaft 93 adapted to swing with the lever. This shaft extends transversely of the housing and carries an arcuate hammer 94 adapted, upon suitable swinging of the bell crank lever 92, to engage the extension of the shipper lever 57 and force the shipper lever out of engagement with the winding drum 52 against the action of the spring pressed plunger 73. This swinging of the bell crank lever is accomplished through the action of a helical spring 95 connected at one end to the housing or a bracket extending therefrom and at its other end to an extension 96 of the bell crank lever. The other arm 97 of the bell crank lever 92 is offset laterally somewhat with respect to the first arm and formed with an angular end face 98 which is normally engaged by a corresponding face formed upon the end of a pawl 99 fixed to the housing or to a bracket extending therefrom. When this pawl engages the angular face of the shorter arm of the bell crank lever, the lever is held in the position shown in Fig. 1 with the spring 95 extended. Upward swinging of the link 87, through movement of the lever 61, acts to swing the lever 90 and, consequently, the bell crank lever 92 and hammer 94 carried thereby to free its shorter arm from the pawl 99 and permit the spring 95 to snap the bell crank lever in such a manner as to throw its hammer into violent contact with the shipper lever 57. One side face of the hammer 94 is formed with a cam shaped projection 100 adapted to engage the hooked terminal 81 of the latch releasing member 80 to swing it laterally out of the way of the latch 76 so as to insure proper engagement of the latch with the shipper lever in order that the plunger 77 may cause the latch to lock the shipper lever in its normal position, as shown in Fig. 1.

Having thus described the mechanism by means of which the clutch may be thrown out and released, in order to permit changing of the transmission gears, I will now describe the selector mechanism for changing the gears. As shown in Fig. 2, I provide a pair of reciprocally mounted gear shifting rods 101 and 102. These rods are slidably mounted at their rear ends in the rear walls of the housing section 11 and at their forward ends in the partition wall 23 and carry shipper levers 103 and 104, respectively, which engage the collars 45 and 47, respectively, of the transmission gearing. The partition wall is formed with cylindrical bores 105 extending at right angles to the rods 101 and 102 to receive pawls 106 held in engagement with the rods by springs 107 which are in turn held in the bores of cap screws 108. The rods 101 and 102 are formed each with a series of notches 109 adapted to seat the ends of the pawls, three of these notches being formed in each rod, the intermediate notch, in each instance, seating the pawl when the gear shifted by such rod is in a neutral position and the other notches seating the pawl when the gear is in either of its active positions.

Figures 6, 7, 8, 9:
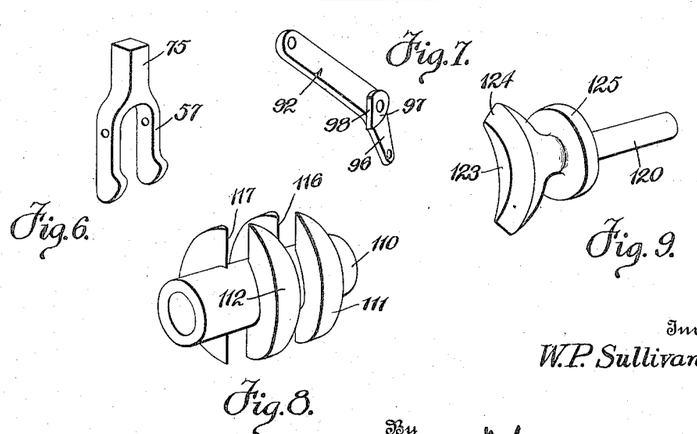
Fig. 6 is a perspective view of the shipper lever employed in throwing in the clutch releasing mechanism.
Fig. 7 is a perspective view of a releasing lever employed in throwing out the clutch releasing mechanism.
Fig. 8 is a perspective view of the drive 85 element of the selector mechanism proper.
Fig. 9 is a perspective view of one of the selector elements which engages the drive element.

Mounted upon and to turn with the shaft 48, is the drive element 110 of the selector mechanism proper. This drive element includes a cylindrical hub portion provided with spaced annular shoulders 111 and 112 defining an intermediate runway 113. These annular shoulders, at one side, are formed with diagonally or helically extending camways or slots 114 and 115, respectively, and at diametrically opposite sides with reversely formed camways or slots 116 and 117, respectively. Mounted upon the gear shifting rods 101 and 102 are selector carrying members 118 and 119 and shafts 120, shown in Fig. 9, extend through these selector carrying members and through the selector rods to connect the members to the rods. These shafts, at their inner ends, carry selector elements proper 121 and 122, the former being correlated with the shipper rod 101 and the latter with the shipper rod 102. Each of these selector elements includes a body having an arcuate inner face 123 adapted to extend in spaced relation to the hub portion of the driven member 110 of the selector mechanism and doubly tapered end portions 124 adapted, upon turning of its shaft 120, to direct the selector element through one or another of the camways of the driven member 110, depending upon the direction in which the shaft 120 is turned and the position which the selector element occupies when such shaft is turned. Each selector element, at its point of juncture with its shaft, is provided with a collar 125 which bears against the inner end of its supporting member 118 and elongated washers 126 and 127 are mounted upon the shafts of the selector elements 121 and 122, respectively, being keyed or otherwise fixed to said shafts and having their extended portions projecting in reverse directions, the extending portion of the washer of the selector member 121 projecting upwardly, while that of the other washer projects downwardly, these extending portions forming crank arms, to which are connected stiff spring wires 128 and 129.

Obviously, assuming that the shaft 48 is being constantly driven, if the lower end of the washer 126 is swung forwardly by means of the wire 128, the selector member will enter the cam slot 117 and pass through the slot, with the result that the shipper rod 101 will be moved forwardly to shift the gear 43 into mesh with the gear 41 which constitutes the low speed drive setting of the transmission gearing. On the other hand, if the same selector element 121 was swung in the opposite direction, it would pass through the cam slot 114 and move the rod 101 rearwardly to shift the gear 43 into mesh with the gear 44 which constitutes the reverse drive of the transmission gearing. In like manner, the selector element 122 may be swung by means of the wire 129 to cause it to move either through the cam slot 115 or the cam slot 116 to cause shifting of the selector rod 102 to either move the gear 36 into mesh with the gear 40, which is the intermediate speed setting of the transmission gearing, or to move the clutch members 34 and 35 into engagement with each other which is the direct or high speed setting of the transmission gearing. It will also be apparent that, because of the manner in which the cam slots are formed, each of the selector elements may always be returned to the intermediate runway 113 between the shoulders 111 and 112 by swinging the selector elements in the proper direction.

Figure 5:
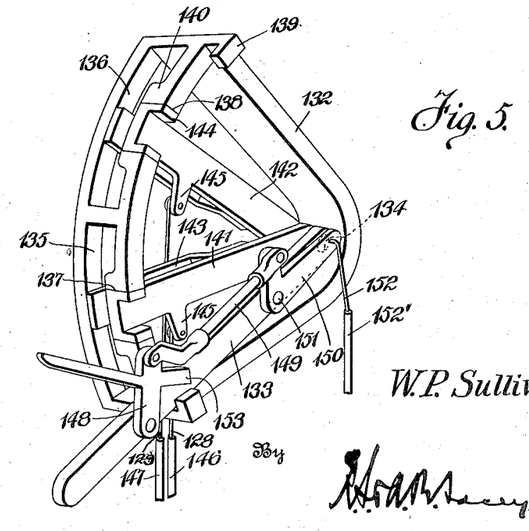
Fig. 5 is a perspective view of the manually operable selector lever and the quadrant upon which it is mounted.

Various means may be provided for operating the clutch controlling bell crank lever 79 and the gear shifting wires 128 and 129. The preferred structure for accomplishing these operations is shown in Fig. 5 of the drawings. As there shown, I provide a quadrant 132 which may be mounted upon any convenient portion of the vehicle, preferably upon the steering column and over which swings the hand lever 133 which is pivoted to the quadrant, as shown at 134, and which extends beyond the peripheral portion thereof. The peripheral or arcuate face of the quadrant is formed with spaced T-slots 135 and 136, the heads of which are in alinement with each other and the stems of which open through one side of the quadrant to provide gates 137 and 138. The ends of the quadrant are formed with stops 139 to limit the swinging movement of the hand lever 133 and this lever 133 is proportioned and mounted so that it may be swung inwardly through either of the gates 137 and 138 and then swung in either direction along the body portion of the T-slot with which said gate communicates. The body portions of the T-slots are restricted in width adjacent the gates, as shown at 140, to prevent accidental swinging of the hand lever into alinement with the gates when located in either of the slots.

Pivoted upon the same pivot 134 as the hand lever 133 are the shifting levers proper 141 and 142 which carry leaf springs 143 which engage the sides of the slots opposite the gateways in such a manner that when either of the gear shifting levers proper is brought into alinement with its gateway, it will be forced to a position to close the gateway, as shown in Fig. 5. These gear shifting levers proper, at their upper ends, are formed with outwardly directed spaced fingers 144 to receive the hand lever 133 so that when the hand lever 133 is forced through either gateway, it will engage the shifting lever proper of that T-slot into which it moves and when swung in either direction will swing such shifting lever. Of course, when the hand lever is moved back into alinement with the gateway and moved out of the slot, it will return the shifting lever to its normal position, closing such gateway. Each of these shifting levers 141 and 142 is formed intermediate its length with an arm 145 and the wires 128 and 129 are connected to the arms of the shifting levers 141 and 142, respectively, running through tubes 146 and 147, respectively, to the casing. This arrangement is such that when the hand lever 133 is operated to move the shifting lever 141 into the upper end of the slot 135, the selector element 121 will be swung or turned in such a manner that it will be driven by the driven member 110 of the selector mechanism to shift the transmission gearing into low speed. On the other hand, when the lever 141 is moved to the lower end of the slot 135, the transmission gearing will be shifted to reverse speed setting. If the hand lever 135 is engaged with the shifting lever 142 and such lever is swung to the lower end of the slot 136, the other selector element 122 will be turned to shift the gears to intermediate speed setting and, if the lever 142 is swung to the upper end of its slot, the transmission gearing will be shifted to high speed setting.

It will, of course, be apparent that some provision should be made to prevent any shifting of the gears of the transmission gearing, while the members of the clutch 16 are in engagement with each other as otherwise injury of certain of the gears of the transmission gearing would probably result. For this reason, I mount a bell crank lever 148 upon the handle portion of the hand lever 133 in much the same manner as the usual hand latch is mounted upon an ordinary brake lever and connect the intermediate portion of the lever 148 by a link 149 to one arm of the bell crank arm 150 which is pivoted intermediate its length upon the lever 133, as shown at 151, and the opposite arm of which terminates, in normal position of the levers 148 and 150, in alinement with the pivot 134. A wire 152 is connected to this arm of the bell crank lever 150 at one end and at its opposite end to the free arm of the bell crank lever 79, running through a tube 152'. Because of this, if the free arm of the latch lever 149 is swung toward the handle end of the hand lever 133, the latch 76 will be released and the clutch 16 will be thrown out, as previously explained. The intermediate portion of the latch lever 148 is formed with an extension 153 which engages against the outer face of the quadrant 132 in such a manner as to prevent passage of the hand lever 133 through either of the gates of the quadrant unless the latch lever 148 is swung to cause throwing out of the clutch. If so swung, this extension 153 is moved beyond the quadrant and the hand lever may be swung to shift any desired gears. When the gears are set in any desired position, the latch lever may be released and the extension 153 will again engage against the other side of the quadrant and will prevent sufficient inward movement of the hand lever to permit its passage past one of the restricted portions or shoulders 140 of the slots and will, therefore, prevent any shifting back of the gears until the latch lever is again operated to again throw out the clutch.

In order to make sure that the clutch will be kept out of engagement until the gears are shifted, I pivot a cam member 154 upon the head of the bolt 68 and connect it by a wire 155 with the bell crank lever 79 so that as long as the lever 148 is held against the lever 133, the cam member will be held in turned position to tighten the brake band 65 about the drum 52. Sufficient slack should be allowed in the wire 155 so that this action will take place only when the latch lever 148 is swung sufficiently to clear the quadrant.

In view of the explanation of the operation of the various mechanisms making up my automatic gear shifting structure, it is believed that any further description of operation is unnecessary. It should be borne in mind, however, that the latch lever, because of the manner in which it is mounted upon the hand lever, will absolutely prohibit the moving of the hand lever in a way to cause any shifting of the gears of the transmission mechanism until the latch lever has first been operated to cause throwing out of the clutch connecting the engine shaft with the drive shaft of the vehicle. In like manner, as soon as the hand lever is released in any recognized position, this latch lever will be released and the latch lifting member will return to engagement with the latch so that it will be in position to again operate when the next shift of the gears is made.

My gear shifting mechanism is very desirable, due to the fact that neither skill nor strength is required for its operation, the manipulation of the hand lever being very simple and the throwing out of the clutch and actual shifting of the gears and letting in of the clutch all being controlled and operated by the engine.

Having thus described the invention, what is claimed as new is:

1. In gear shifting mechanisms for transmission gearings, the combination with a clutch through which power is transmitted to the transmission gearing and a transmission gearing including reciprocally mounted gear shifter rods, of power driven means operable to move either shifter rod in either direction, means controllable by a single hand lever governing the power operated means to select which rod shall be shifted and in which direction, and power driven means for throwing out the clutch and for subsequently releasing the clutch, said means operating in conjunction with the hand lever.

2. In gear shifting mechanisms for transmission gearings, the combination with a clutch through which power is transmitted to the transmission gearing and a transmission gearing including reciprocally mounted gear shifter rods, of power driven means operable to move either shifter rod in either direction, means controllable by a single hand lever governing the power operated means to select which rod shall be shifted and in which direction, and power driven means for throwing out the clutch and for subsequently releasing the clutch, said means operating in conjunction with the hand lever and being arranged to prevent manipulation of the hand lever until operated to throw out the clutch.

3. In gear shifting mechanisms for transmission gearings, the combination with a transmission gearing, means for shifting the gearing, and a clutch including a movable clutch element, of manually controlled power driven means for throwing out the clutch, said means including an engine driven shaft, a winding drum mounted upon the shaft, a clutch operating lever, means connected to the lever and windable about the drum to operate the lever, and means releasable manually for locking the winding drum to the shaft.

4. In gear shifting mechanisms for transmission gearings, the combination with a transmission gearing, means for shifting the gearing, and a clutch including a movable clutch element, of manually controlled power driven means for throwing out the clutch, said means including an engine driven shaft, a winding drum mounted upon the shaft, a clutch operating lever, means connected to the lever and windable about the drum to operate the lever, means releasable manually for locking the winding drum to the shaft, and means operable upon a predetermined swinging of the lever for releasing the winding drum from the shaft.

5. In gear shifting mechanisms for transmission gearings, the combination with a transmission gearing including reciprocally mounted shifter rods, of a constantly driven shaft, shifter elements carried by the rods and projecting in proximity to the shaft, a driven shifter element turning with the shaft and adapted to engage the shifter elements to move the shifter rods, and means for manually moving the shifter elements into and out of selective engagement with the driven shifter element.

6. In gear shifting mechanism for transmission gearings, the combination with a transmission gearing including reciprocally mounted shifter rods, of an engine driven shaft, a shifting element fixed to turn with the shaft and having spaced annular shoulders formed at diametrically opposite sides with reversely arranged diagonally extending camways, members seating between the shoulders at opposite sides of the shaft and mounted upon the shifter rods for turning movement, and manually controlled means for turning such members to cause either member to selectively move through one or another of the camways.

7. In gear shifting mechanisms for transmission gearings, the combination with a transmission gearing including reciprocally mounted shifter rods, of an engine driven shaft, a shifting element fixed to turn with the shaft and having spaced annular shoulders formed at diametrically opposite sides with reversely arranged diagonally extending camways, members seating between the shoulders at opposite sides of the shaft and mounted upon the shifter rods for turning movement, and manually controlled means for turning such members to cause either member to selectively move through one or another of the camways, said means including a quadrant having gateways and slots, a hand lever movable through the quadrant and the gateways and along the slots, and levers mounted in the slots and engageable by the hand lever and having operative connection to the members carried by the shifter rods.

8. In gear shifting mechanisms, the combination with a clutch, and a transmission gearing, of means for selectively shifting the transmission gearing, power operated means for moving the clutch to inactive position during such shifting and for permitting its return to active position after such shifting, and a brake for checking the return movement of the clutch.

9. In gear shifting mechanisms, the combination with a clutch and a transmission gearing, of means for selectively shifting the transmission gearing, power operated means for moving the clutch to inactive position during such shifting and for permitting its return to active position after such shifting, and an adjustable brake for checking the return movement of the clutch.

10. In a gear shifting mechanism, the combination with a transmission gearing including reciprocally mounted gear shifter rods, of a constantly driven shaft, a gear shifting element mounted on the shaft and including spaced annular shoulders formed at one side with helical grooves and at their opposite sides with reverse helical grooves, selector elements carried by the selector rods for travel between the shoulders and in the grooves, and controlling means for the selector elements whereby they may be caused to travel in predetermined portions of the grooves to cause reciprocation of either selector rod in either direction.

11. In gear shifting mechanisms, the combination with a clutch, of a lever for moving the clutch to inactive position, a constantly driven shaft, a winding drum loose upon the shaft, manually operable means for frictionally locking the winding drum to the shaft, connecting means for the lever and drum whereby rotation of the drum will swing the lever to release the clutch, and means for automatically disconnecting the winding drum from the shaft.

12. In gear shifting mechanisms, the combination with a clutch, of a lever for moving the clutch to inactive position, a constantly driven shaft, a winding drum loose upon the shaft, manually operable means for frictionally locking the winding drum to the shaft, connecting means for the lever and drum whereby rotation of the drum will swing the lever to release the clutch, means for automatically disconnecting the winding drum from the shaft, and a brake band adjustably offering resistance to the turning of the drum.

13. In gear shifting mechanisms for transmission gearings, the combination with a clutch through which power is transmitted to the transmission gearing and a transmission gearing, of power driven means to selectively shift the transmission gearing to obtain any selected speed ratio, power driven means for moving the clutch to inactive position and subsequently releasing it, whereby the clutch is inactive during shifting of the transmission gearing, and a hand lever and latch controlling both power driven means whereby one cannot be operated independently of the other.

In testimony whereof I affix my signature.

WALTER P. SULLIVAN. [L. S.]